US012361848B2

(12) United States Patent
Hong

(10) Patent No.: US 12,361,848 B2
(45) Date of Patent: Jul. 15, 2025

(54) DISPLAY DEVICE AND METHOD OF COMPENSATING FOR DETERIORATION OF DISPLAY DEVICE

(71) Applicant: Samsung Display Co., Ltd., Yongin-si (KR)

(72) Inventor: Seokha Hong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 67 days.

(21) Appl. No.: 17/992,280

(22) Filed: Nov. 22, 2022

(65) Prior Publication Data

US 2023/0252920 A1 Aug. 10, 2023

(30) Foreign Application Priority Data

Feb. 8, 2022 (KR) ........................ 10-2022-0016375

(51) Int. Cl.
*G09G 3/00* (2006.01)
*G09G 3/3225* (2016.01)
(Continued)

(52) U.S. Cl.
CPC ........... *G09G 3/003* (2013.01); *G09G 3/3225* (2013.01); *G09G 3/20* (2013.01); *G09G 3/2092* (2013.01); *G09G 3/32* (2013.01); *G09G 5/227* (2013.01); *G09G 2300/04* (2013.01); *G09G 2320/0233* (2013.01); *G09G 2320/0257* (2013.01);
(Continued)

(58) Field of Classification Search
CPC ................. G09G 3/003; G09G 3/3225; G09G 2320/0285; G09G 2320/029; G09G 2320/04; G09G 3/20; G09G 3/32; G09G 3/2092; G09G 5/227; G09G 2300/04; G09G 2320/0233; G09G 2320/0257; G09G 2320/045; G09G 2320/046; G09G 2320/048; G09G 2330/12; G09G 2340/04; G09G 2360/16
See application file for complete search history.

(56) References Cited

U.S. PATENT DOCUMENTS 11,238,787 B2 2/2022 An
2016/0098952 A1* 4/2016 Han ..................... G09G 3/3225 345/76

(Continued)

FOREIGN PATENT DOCUMENTS

KR 1020170079882 A 7/2017
KR 1020190088150 A 7/2019

*Primary Examiner* — William Boddie
*Assistant Examiner* — Saifeldin E Elnafia
(74) *Attorney, Agent, or Firm* — CANTOR COLBURN LLP

(57) ABSTRACT

A display device includes a display panel which displays an image, where a plurality of areas, in each of which a plurality of pixels is positioned, is defined in the display panel, and a controller which generates image data based on an image signal received from the outside and compensates for deterioration of the display panel. The controller includes a stress information generator which generates stress information of the display panel corresponding to the deterioration and a deterioration compensator which changes at least one selected from a spatial resolution and a bit-depth of each of the plurality of areas based on the stress information of each of the plurality of areas.

19 Claims, 11 Drawing Sheets

(51) Int. Cl.
*G09G 3/20* (2006.01)
*G09G 3/32* (2016.01)
*G09G 5/22* (2006.01)

(52) U.S. Cl.
CPC ............... *G09G 2320/0285* (2013.01); *G09G 2320/029* (2013.01); *G09G 2320/04* (2013.01); *G09G 2320/045* (2013.01); *G09G 2320/046* (2013.01); *G09G 2320/048* (2013.01); *G09G 2330/12* (2013.01); *G09G 2340/04* (2013.01); *G09G 2360/16* (2013.01)

(56) References Cited

U.S. PATENT DOCUMENTS

2016/0210903 A1* 7/2016 Jun ...................... G09G 3/3275
2018/0151119 A1* 5/2018 Lee ...................... G09G 3/3233
2019/0027097 A1* 1/2019 Kato .................... G09G 3/3266
2019/0221158 A1* 7/2019 An ....................... G09G 3/3266
2021/0201724 A1* 7/2021 Choi ...................... G09G 3/035

* cited by examiner

DISPLAY DEVICE AND METHOD OF COMPENSATING FOR DETERIORATION OF DISPLAY DEVICE

This application claims priority to Korean Patent Application No. 10-2022-0016375, filed on Feb. 8, 2022, and all the benefits accruing therefrom under 35 U.S.C. § 119, the content of which in its entirety is herein incorporated by reference.

BACKGROUND

1. Field

Embodiments of the disclosure described herein relate to a display device and a method of compensating for deterioration of the display device, and more particularly, relate to a display device for compensating for deterioration while the size of a memory is maintained, and a method of compensating for deterioration of the display device.

2. Description of the Related Art

A display device typically includes a display panel and a display panel driver. The display panel may include a plurality of gate lines, a plurality of data lines, and a plurality of pixels. The display panel driver may include a gate driver for providing a gate signal to a plurality of gate lines, a data driver for providing a data voltage to data lines, and a timing controller for controlling the driving timing of each of the gate driver and the data driver.

Such a display device may be an organic light emitting display device using an organic light emitting diode or a liquid crystal display device using liquid crystal molecules, for example.

SUMMARY

In an organic light emitting display device, luminance deviation between pixels and afterimage may be caused due to the deterioration of a pixel or an organic light emitting diode therein. Accordingly, input image data may be desired to be compensated to increase display quality. However, it is desired to improve image quality of the organic light emitting display device while reducing a memory size to reduce manufacturing cost thereof.

In embodiments of the disclosure, deterioration of a display panel is compensated by receiving stress information corresponding to a deterioration level of the display panel and changing at least one selected from a spatial resolution and a bit-depth in each of a plurality of areas of the display panel based on the stress information.

In embodiments of the disclosure, a memory size used to precisely compensate for the deterioration of the display panel is reduced.

According to an embodiment, a display device includes a display panel which displays an image, where a plurality of areas, in each of which a plurality of pixels is positioned, is defined in the display panel and a controller which generates image data based on an image signal and compensates for deterioration of the display panel. In such an embodiment, the controller includes a stress information generator which generates stress information of the display panel corresponding to the deterioration and a deterioration compensator which changes at least one selected from a spatial resolution and a bit-depth of each of the plurality of areas based on the stress information of each of the plurality of areas.

In an embodiment, the display device may further include a memory connected to the controller, where the memory stores the stress information. In such an embodiment, a plurality of blocks, each of which includes the plurality of pixels, may be defined in each of the plurality of areas. In such an embodiment, the stress information may be stored in units of blocks.

In an embodiment, the spatial resolution may be determined based on a number of the plurality of pixels included in each of a plurality of blocks included in each of the plurality of areas. In such an embodiment, the number of the plurality of pixels included in each of the plurality of blocks may be proportional to a block size of each of the plurality of blocks. In such an embodiment, the deterioration compensator may change the block size in each of the plurality of areas to be inversely proportional to a stress level of each of the plurality of areas.

In an embodiment, the deterioration compensator may change the bit-depth of each of the plurality of areas to be proportional to a stress level of the display panel in each of the plurality of areas.

In an embodiment, the deterioration compensator may include a receiver which receives the stress information including information about a stress level and a deterioration area size of the display panel from the stress information generator, a determiner which determines the stress level and the deterioration area size, and a processor which changes at least one selected from the spatial resolution and the bit-depth based on the determined stress level and the determined deterioration area size.

In an embodiment, the determiner may determine a deterioration stage as a first stage when a deterioration area size of the plurality of areas is smaller than a first reference area size and the stress level is smaller than a first reference level. In such an embodiment, the determiner may determine the deterioration stage as a second stage when the deterioration area size is not smaller than the first reference area size and is smaller than a second reference area size and the stress level is not smaller than the first reference level and is smaller than a second reference level, In such an embodiment, the determiner may determine the deterioration stage as a third stage when the deterioration area size is not smaller than the second reference area size and the stress level is not smaller than the second reference level. In such an embodiment, the determiner may selectively changes the at least one selected from the spatial resolution or the bit-depth depending on the deterioration stage. In such an embodiment, the second reference area size may be greater than the first reference area size and the second reference level may be greater than the first reference level.

In an embodiment, the processor may change the spatial resolution of each of the plurality of areas and may fix the bit-depth when the deterioration stage is the first stage.

In an embodiment, the processor may change the spatial resolution and the bit-depth of each of the plurality of areas when the deterioration stage is the second stage.

In an embodiment, the changed spatial resolution and the changed bit-depth of each of the plurality of areas may be proportional to each other when the deterioration stage is the second stage.

In an embodiment, the processor may fix the spatial resolution of each of the plurality of areas and may change the bit-depth when the deterioration stage is the third stage.

In an embodiment, the processor may fix the spatial resolution of each of the plurality of areas to a maximum value and may reduce the bit-depth when the deterioration stage is the third stage.

In an embodiment, the display device may further include a memory connected to the controller, where the memory may store the stress information. In such an embodiment, a size of the memory may be constant regardless of the deterioration area size and the stress level.

In an embodiment, an average value of the spatial resolution of each of the plurality of areas when the deterioration stage is the first stage is smaller than an average value of the spatial resolution of each of the plurality of areas when the deterioration stage is the second stage. In such an embodiment, the average value of the spatial resolution of each of the plurality of areas when the deterioration stage is the second stage is smaller than an average value of the spatial resolution of each of the plurality of areas when the deterioration stage is the third stage.

In an embodiment, an average value of the bit-depth of each of the plurality of areas when the deterioration stage is the first stage is greater than an average value of the bit-depth of each of the plurality of areas when the deterioration stage is the second. In such an embodiment, the average value of the bit-depth of each of the plurality of areas when the deterioration stage is the second stage is greater than an average value of the bit-depth of each of the plurality of areas when the deterioration stage is the third stage.

In an embodiment, when the deterioration stage is changed from the first stage to the second stage, an average value of the spatial resolution of each of the plurality of areas may increase and an average value of the bit-depth of each of the plurality of areas may decrease.

According to an embodiment, a method of compensating for deterioration of a display device includes generating, by a stress information generator, stress information corresponding to the deterioration of a display panel and changing, by a deterioration compensator, at least one selected from a spatial resolution and a bit-depth of each of a plurality of areas based on the stress information of each of the plurality of areas defined in the display panel.

In an embodiment, the changing, by a deterioration compensator, the at least one selected from the spatial resolution and the bit-depth may include receiving a deterioration area size and the stress information of the display panel, determining a stage of the deterioration based on the received deterioration area size and the received stress information, and changing the at least one selected from the spatial resolution and the bit-depth depending on the stage of the deterioration.

In an embodiment, the determining of the stage of the deterioration may include determining that the stage of the deterioration is a first stage, when the deterioration area size of the plurality of areas is smaller than a first reference area size and a stress level is smaller than a first reference level, determining that the stage of the deterioration is a second stage, when the deterioration area size is not smaller than the first reference area size and is smaller than a second reference area size and the stress level is not smaller than the first reference level and is smaller than a second reference level, and determining that the stage of the deterioration is a third stage, when the deterioration area size is not smaller than the second reference area size and the stress level is not smaller than the second reference level. In such an embodiment, the second reference area size may be greater than the first reference area size, and the second reference level may be greater than the first reference level.

In an embodiment, the changing the at least one selected from the spatial resolution and the bit-depth depending on the stage of the deterioration may include changing the spatial resolution of each of the plurality of areas and fixing the bit-depth when the stage of the deterioration is the first stage, changing the spatial resolution and the bit-depth of each of the plurality of areas when the stage of the deterioration is the second stage, and fixing the spatial resolution of each of the plurality of areas and changing the bit-depth when the stage of the deterioration is the third stage.

In an embodiment, the spatial resolution may be determined based on a number of a plurality of pixels included in each of a plurality of blocks included in each of the plurality of areas. In such an embodiment, the number of the plurality of pixels may be proportional to a block size of each of the plurality of blocks. In such an embodiment, the changing, by a deterioration compensator, the at least one selected from the spatial resolution and the bit-depth may include changing the block size to be inversely proportional to a stress level of the display panel in each of the plurality of areas, and changing the bit-depth to be proportional to the stress level of the display panel in each of the plurality of areas.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
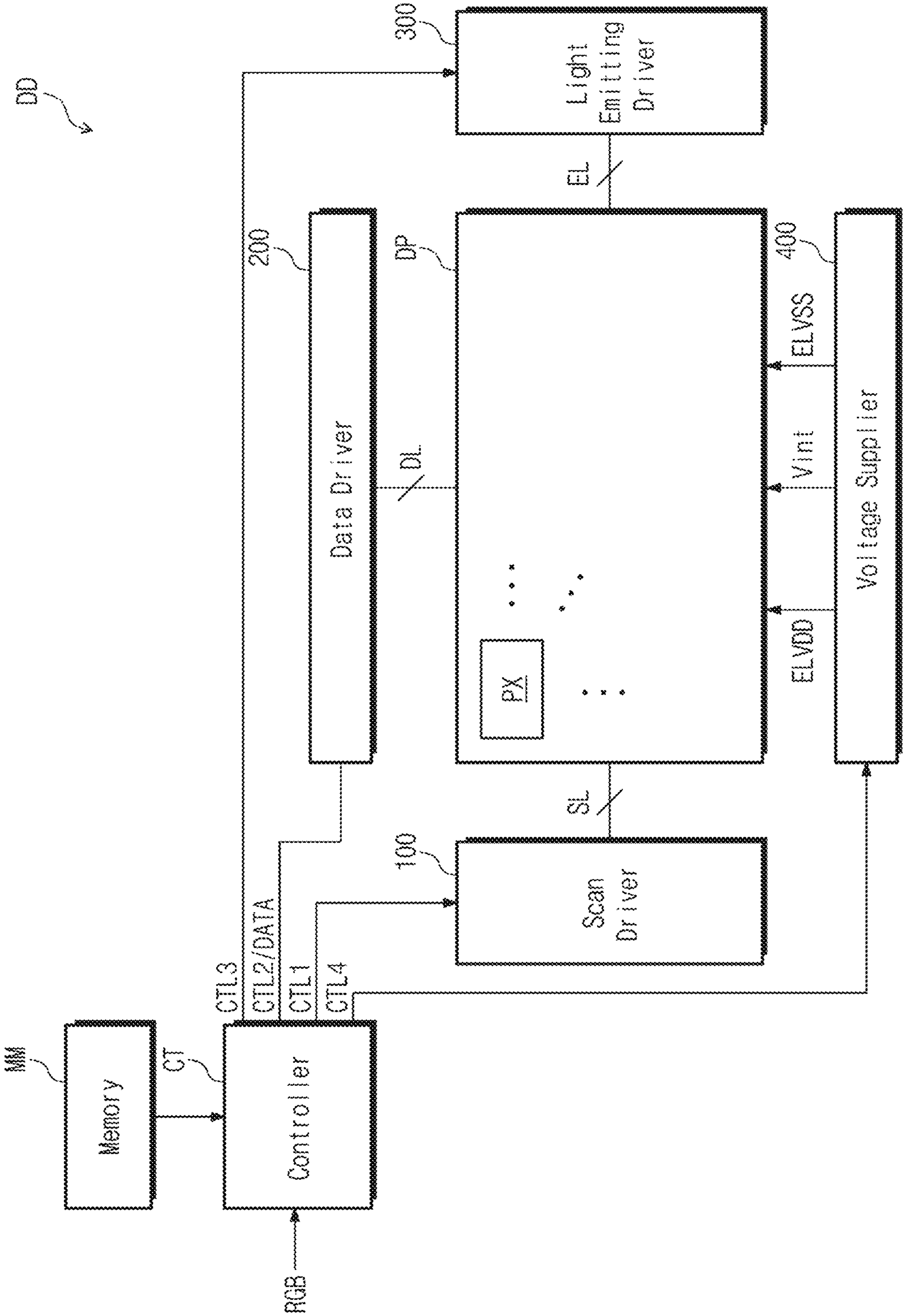
FIG. 1 is a block diagram of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to the accompanying drawings.

Figure 2:
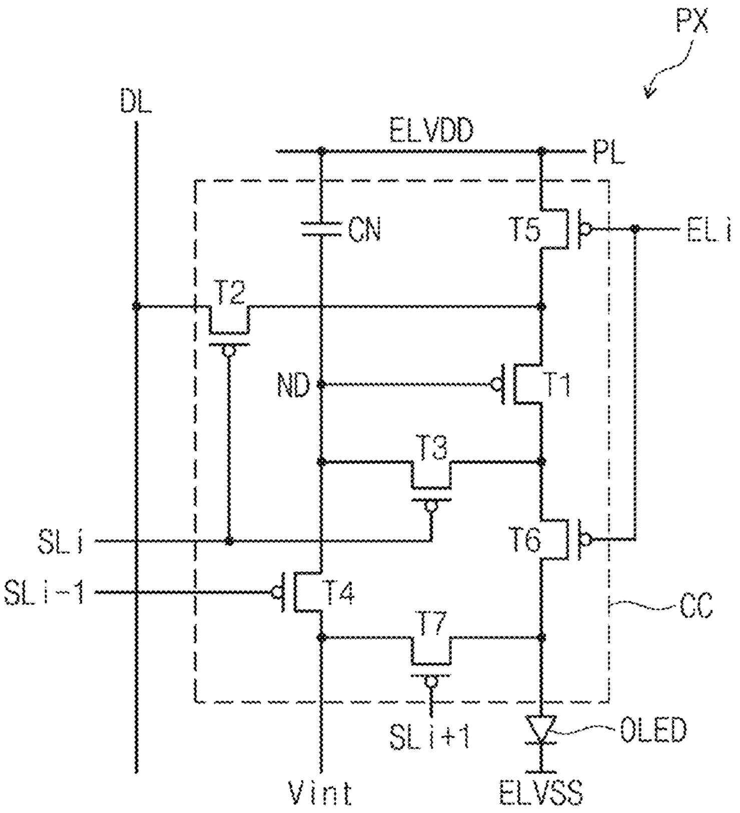
FIG. 2 is an equivalent circuit diagram of one pixel among a plurality of pixels, according to an embodiment of the disclosure.

FIG. 1 is a block diagram of a display device, according to an embodiment of the disclosure. FIG. 2 is an equivalent circuit diagram of one pixel among a plurality of pixels, according to an embodiment of the disclosure.

According to an embodiment of the disclosure, an embodiment of a display device DD may be a large display device such as a television, a monitor, or an outer billboard. Alternatively, the display device DD may be a small or medium display device such as a personal computer, a notebook computer, a personal digital terminal, an automotive navigation system, a game console, a smartphone, a tablet, or a camera. However, this is an example, and the display device DD may include other display devices or electronic devices having a display function, without departing from the concept of the disclosure.

Referring to FIGS. 1 and 2, an embodiment of the display device DD may include a display panel DP, a controller CT, a scan driver 100, a data driver 200, a light emitting driver 300, a voltage supplier 400, and a memory MM.

The display panel DP according to an embodiment of the disclosure may be a light emitting display panel, but is not particularly limited thereto. In an embodiment, for example, the display panel DP may be an organic light emitting display panel or a quantum dot light emitting display panel. A light emitting layer of the organic light emitting display panel may include an organic light emitting material. An emission layer of the quantum dot light emitting display panel may include a quantum dot, a quantum rod, or the like. Hereinafter, for convenience of description, embodiments where the display panel DP is an organic light emitting display panel will be described in detail.

In an embodiment, the display panel DP may include a plurality of data lines DL, a plurality of scan lines SL, a plurality of emission control lines EL, and a plurality of pixels PX.

In such an embodiment, although not illustrated in drawings, the plurality of data lines DL may cross the plurality of scan lines SL. The plurality of scan lines SL and the plurality of emission control lines EL may be arranged side by side. A plurality of pixel areas may be defined through the plurality of data lines DL, the plurality of scan lines SL, and the plurality of emission control lines EL. The plurality of pixels PX for displaying an image may be provided in the plurality of pixel areas. The plurality of data lines DL, the plurality of scan lines SL, and the plurality of emission control lines EL may be insulated from one another.

Each of the plurality of pixels PX may be connected to at least one data line, at least one scan line, and at least one emission control line. The pixel PX may include a plurality of sub pixels. Each of the plurality of sub pixels may display one of primary colors or one of mixed colors. The primary color may include red, green, or blue. The mixed color may include various colors such as white, yellow, cyan, or magenta. However, this is an example, and the color displayed by the sub pixel according to an embodiment of the disclosure is not limited thereto.

The controller CT, the scan driver 100, the data driver 200, and the light emitting driver 300 may be electrically connected to the display panel DP in a form of a chip on flexible printed circuit (COF), a chip on glass (COG), a flexible printed circuit (FPC) or other various forms.

The controller CT may receive an image signal RGB provided from the outside. The controller CT may output first to fourth driving control signals CTL1, CTL2, CTL3, and CTL4 and image data DATA. The first driving control signal CTL1 may be a signal for controlling the scan driver 100. The second driving control signal CTL2 may be a signal for controlling the data driver 200. The third driving control signal CTL3 may be a signal for controlling the light emitting driver 300. The fourth driving control signal CTL4 may be a signal for controlling the voltage supplier 400. The controller CT may output the image data DATA generated by converting the data format of the image signal RGB.

The memory MM may store information about voltage values of signals exchanged between the respective components CT, DP, 100, 200, 300, and 400 in the display device DD. The memory MM may be present as a separate component or may be included in at least one of the respective components CT, DP, 100, 200, 300, and 400. The memory MM may store stress information about the image signal RGB. The stress information may be generated by the controller CT. The memory MM may have a limited memory size for storing the stress information. The stress information of pixels of the display panel DP may be stored in units of blocks. Accordingly, as will be described later, compensation for stress may be performed in units of blocks. Here, the stress information may correspond to stress information generated depending on the image output based on the image signal RGB, and the stress information may refer to accumulated stress information accumulated depending on an output time or a usage time.

In an embodiment, the controller CT may compensate for deterioration based on the image signal RGB and may generate the image data DATA. The controller CT may generate stress information about the deterioration of the display panel DP from the image signal RGB and may provide the stress information to the memory MM. The controller CT may compensate for the deterioration based on the generated stress information. The compensation for the deterioration will be described in greater detail with reference to FIGS. 4 to 8C.

The scan driver 100 may provide a scan signal to each of the plurality of pixels PX through the plurality of scan lines SL based on the first driving control signal CTL1. An image may be displayed on the display panel DP based on the scan signal.

The data driver 200 may provide a data voltage to the plurality of pixels PX through the plurality of data lines DL based on the second driving control signal CTL2. The data driver 200 may convert the image data DATA to the data voltage. The data voltage may be analog voltages corresponding to grayscale values of the image data DATA. An image displayed on the display panel DP may be determined based on the data voltage.

The light emitting driver 300 may provide an emission control signal to the plurality of pixels PX through the plurality of emission control lines EL based on the third driving control signal CTL3. The luminance of the display panel DP may be adjusted based on the emission control signal.

The voltage supplier 400 may provide a first power supply voltage ELVDD, a second power supply voltage ELVSS, and an initialization voltage Vint to the display panel DP based on the fourth driving control signal CTL4. The display panel DP may be driven based on the first power supply voltage ELVDD and the second power supply voltage ELVSS.

In an embodiment, as shown in FIG. 2, each of the plurality of pixels PX may include a light emitting element OLED and a pixel circuit CC. The pixel circuit CC may include a plurality of transistors T1 to T7 and a capacitor CN. The pixel circuit CC may control the amount of current flowing through the light emitting element OLED in response to the data voltage.

The light emitting element OLED may emit light with a predetermined luminance in response to the amount of current provided from the pixel circuit CC. The level of the first power supply voltage ELVDD may be set to be higher than the level of the second power supply voltage ELVSS.

Each of the plurality of transistors T1 to T7 may include an input electrode (or a source electrode), an output electrode (or a drain electrode), and a control electrode (or a scan electrode). In the specification, for convenience of description, one of the input electrode and the output electrode may be referred to as a "first electrode", and the other thereof may be referred to as a "second electrode".

The first electrode of the first transistor T1 may be connected to the power supply pattern VDD via the fifth transistor T5. The second electrode of the first transistor T1 may be connected to an anode electrode of the light emitting element OLED via the sixth transistor T6. The first transistor T1 may be referred to as a driving transistor.

The second transistor T2 may be connected between the data line DL and the first electrode of the first transistor T1. A control electrode of the second transistor T2 may be connected to an i-th scan line SLi. When the i-th scan signal is provided to the i-th scan line SLi, the second transistor T2 may be turned on and thus may electrically connect the data line DL and the first electrode of the first transistor T1 to each other.

The third transistor T3 may be connected between the second electrode of the first transistor T1 and the control electrode of the first transistor T1. A control electrode of the third transistor T3 may be connected to the i-th scan line SLi. When the i-th scan signal is provided to the i-th scan line SLi, the third transistor T3 is turned on and thus may electrically connect the second electrode of the first transistor T1 and the control electrode of the first transistor T1 to each other. When the third transistor T3 is turned on, the first transistor T1 may be diode-connected.

The fourth transistor T4 may be connected between a node ND and an initialization power supply generator of the voltage supplier 400. A control electrode of the fourth transistor T4 may be connected to an (i−1)-th scan line SLi−1. When the (i−1)-th scan signal is provided to the (i−1)-th scan line SLi−1, the fourth transistor T4 may be turned on and thus may provide the initialization voltage Vint to the node ND.

The fifth transistor T5 may be connected between the power supply line PL and the first electrode of the first transistor T1. A control electrode of the fifth transistor T5 may be connected to an i-th emission control line ELi.

The sixth transistor T6 may be connected between the second electrode of the first transistor T1 and the anode electrode of the light emitting element OLED. A control electrode of the sixth transistor T6 may be connected to the i-th emission control line ELi.

The seventh transistor T7 may be connected between the initialization power supply generator and the anode electrode of the light emitting element OLED. A control electrode of the seventh transistor T7 may be connected to an (i+1)-th scan line SLi+1. When an (i+1)-th gate signal is provided to the (i+1)-th scan line SLi+1, the seventh transistor T7 may be turned on and thus may provide the initialization voltage Vint to the anode electrode of the light emitting element OLED.

The seventh transistor T7 may improve the black expression ability of the pixel PX. When the seventh transistor T7 is turned on, a parasitic capacitor (not shown) of the light emitting element OLED may be discharged. When black luminance is implemented, the light emitting element OLED may not emit light due to a leakage current from the first transistor T1, thereby improving black expression ability.

FIG. 2 illustrates that an embodiment where control electrode of the seventh transistor T7 is connected to the (i+1)-th scan line SLi+1, but the disclosure is not limited thereto. In an alternative embodiment of the disclosure, the control electrode of the seventh transistor T7 may be connected to the i-th scan line SLi or the (i−1)-th scan line SLi−1.

FIG. 2 illustrates an embodiment where transistors are P-type metal-oxide-semiconductor (PMOS) transistors, but an embodiment is not limited thereto. In an alternative embodiment of the disclosure, the pixel circuit CC may be implemented with N-type metal-oxide-semiconductor (NMOS) transistors. In another alternative embodiment of the disclosure, the pixel circuit CC may be implemented with a combination of PMOS transistors and NMOS transistors.

The capacitor CN is connected between the power line PL and the node ND. The capacitor CN may store the data voltage. When the fifth transistor T5 and the sixth transistor T6 are turned on depending on the voltage stored in the capacitor CN, the amount of current flowing to the first transistor T1 may be determined. In the disclosure, the equivalent circuit of the pixel PX is not limited to the equivalent circuit shown in FIG. 2. In an alternative embodiment of the disclosure, the pixel PX may be implemented in various forms to allow the light emitting element OLED to emit a light.

Figure 3:
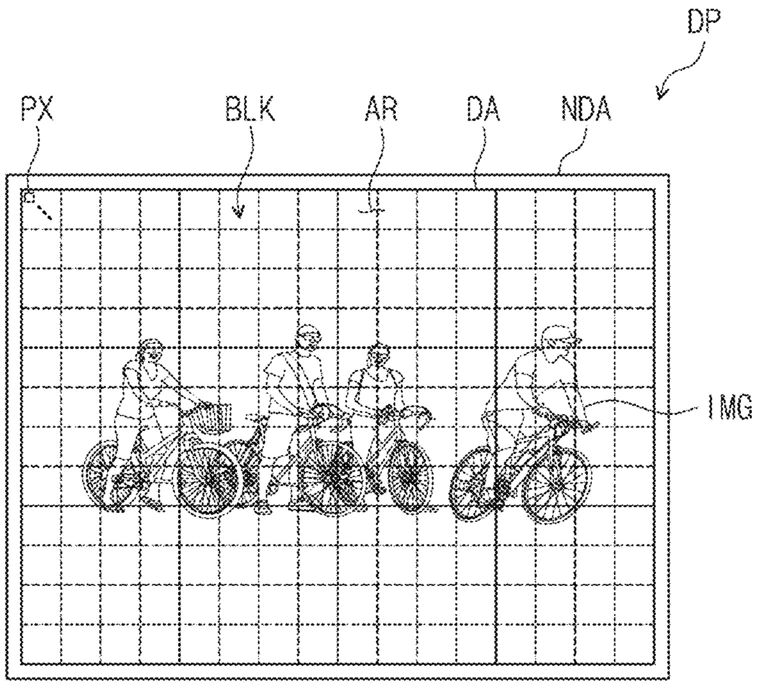
FIG. 3 is a plan view of a display panel, according to an embodiment of the disclosure.

FIG. 3 is a plan view of a display panel, according to an embodiment of the disclosure.

The display panel DP may display an image IMG. The display panel DP may include a display area DA for displaying the image IMG and a non-display area NDA adjacent to the display area DA. The display area DA of the display panel DP may include or be divided into a plurality of areas AR (i.e., areas divided by solid lines in FIG. 3). In an embodiment, the plurality of areas AR is defined as an example, and the display area DA may be arbitrarily divided into a plurality of areas. FIG. 3 illustrates an embodiment where the display area DA is divided into 12 areas AR, but an embodiment is not limited thereto.

As time goes by, an afterimage due to deterioration may occur in the display area DA of the display panel DP. The afterimage of the display area DA may have different degrees in each of the plurality of areas AR. According to an embodiment of the disclosure, the display device DD may compensate for deterioration in a plurality of areas of the display panel DP based on deterioration information or stress information, which includes information about an area where an afterimage of the display panel DP occurs, and an extent to which an afterimage occurs for each area.

In an embodiment, a plurality of blocks BLK (indicated by dotted lines in FIG. 3) may be positioned in each of the plurality of areas AR. Each of the plurality of blocks BLK may include the plurality of pixels PX. A block size of each of the plurality of blocks BLK may be determined depending on the number of the plurality of pixels PX included in each of the plurality of blocks BLK. As the number of the plurality of pixels PX included in each of the plurality of blocks BLK increases, the block size may increase. As the number of the plurality of pixels PX included in each of the plurality of blocks BLK decreases, the block size may decrease.

FIG. 3 illustrates an embodiment where the 16 blocks BLK are included in each area AR, and the plurality of pixels PX are positioned in each of the blocks BLK. In an embodiment, for example, 64 pixels may be positioned in each of the blocks BLK. In such an embodiment, the block size may be referred to as 8×8. Alternatively, one pixel may be positioned in each of the blocks BLK. In such an embodiment, the block size may be referred to as 1×1.

In an embodiment, as shown in FIG. 3, sizes of the plurality of areas AR are the same as one another. Accordingly, the numbers of the plurality of pixels PX positioned in each of the plurality of areas AR may be the same as one another. As the number of pixels positioned for each block decreases, the block size may decrease, and the number of blocks positioned in one area may increase.

As the block size decreases, a spatial resolution may increase. Here, the spatial resolution may correspond to a criterion for expressing the image IMG on a spatial area in detail. As the plurality of pixels PX is finely divided into a plurality of blocks in each of the plurality of areas AR, the spatial resolution may increase and the block size may decrease. In an embodiment, each spatial resolution for a plurality of areas may be set differently to compensate for deterioration. The spatial resolutions, which are set differently from one another, may be set based on the degree of deterioration occurring in each area.

In an embodiment, the compensation for deterioration may be performed in units of blocks, that is, on a block-by-block basis. Accordingly, as the spatial resolution increases and the block size decreases, the compensation may be precise. In an embodiment, for example, where one pixel is included in each block, the deterioration is compensated in units of one pixel. In an embodiment, for example, where 64 pixels are included in one block, the degradation is compensated in units of 64 pixels.

As the spatial resolution increases and the block size decreases, the memory size used for the compensation may increase. However, this corresponds to a case when the bit-depth of each of a plurality of areas is fixed. Here, the bit-depth may correspond to the number of bits used to express the color of the one pixel PX. In an embodiment, for example, where the bit-depth is 42 bits and the block size is 1×1, the memory size may be 1045 Mb. In an embodiment, for example, where the bit-depth is 42 bits and the block size is 4×4, the memory size may be 65 Mb. When the bit-depth decreases, the memory size may decrease.

According to an embodiment of the disclosure, for the purpose of performing precise compensation while the memory size is maintained, it is possible to receive stress information for each of a plurality of areas and to compensate for deterioration for each of the plurality of areas based on the received stress information. In such an embodiment, the deterioration may be compensated by adjusting a spatial resolution or a bit-depth for each of the plurality of areas. A detailed description thereof will be given below with reference to FIGS. 4 to 8C.

Figure 4:
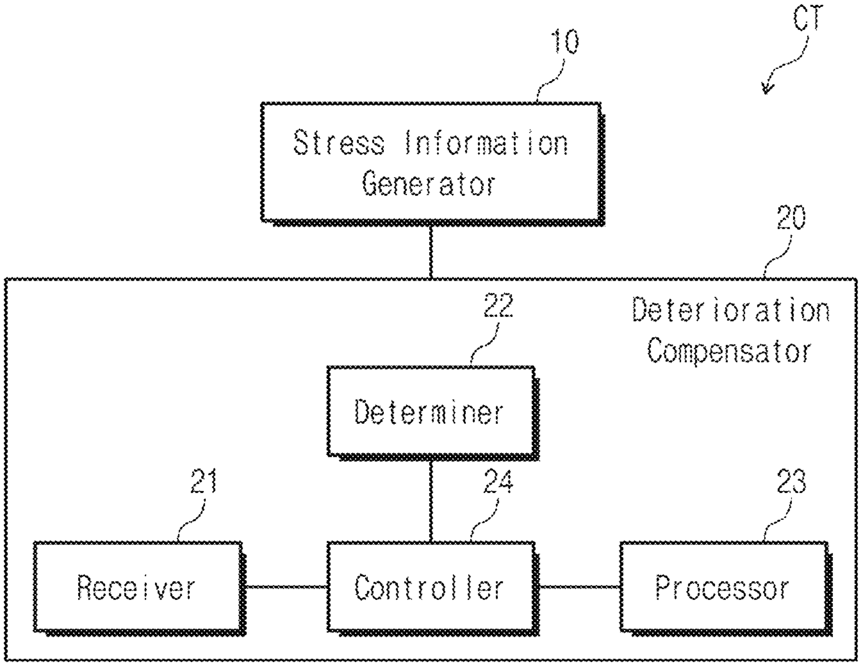
FIG. 4 is a block diagram of a controller, according to an embodiment of the disclosure.

FIG. 4 is a block diagram of a controller, according to an embodiment of the disclosure. An embodiment of the controller CT may include a stress information generator 10 and a deterioration compensator 20. In such an embodiment, the deterioration compensator 20 may include a receiver 21, a determiner 22, a processor 23, and a controller 24.

The controller CT may receive the image signal RGB (see FIG. 1) and may output the image data DATA (see FIG. 1) converted through deterioration compensation for compensating for deterioration of a display panel.

The stress information generator 10 may generate stress information from the image signal RGB. The stress information may be accumulated to generate the accumulated stress information. The stress information may be stored inside the controller CT or may be stored in the memory MM (see FIG. 1).

The deterioration compensator 20 may receive the stress information, may determine a deterioration area and a deterioration level, and may perform deterioration compensation processing based on the deterioration area and the deterioration level. The deterioration compensator 20 may receive the stress information from the stress information generator 10 or the memory MM. That is, the controller CT may generate the image data DATA by calculating a deterioration compensation value of the image signal RGB received from the outside. In an embodiment, the controller CT may vary at least one selected from a spatial resolution and a bit-depth for the plurality of areas AR (see FIG. 3) of the display panel DP (see FIG. 1) based on the stress information, may calculate a compensation value, and may generate the image data DATA.

The receiver 21 may receive the stress information from the stress information generator 10 or the memory MM. The stress information includes information about a stress level. The stress information may include deterioration information indicating a deterioration level or deterioration area size of the display panel DP.

The determiner 22 may determine a deterioration stage of the display panel DP based on the stress level and/or deterioration area size of the display panel DP. The determiner 22 may divide deterioration stages into a first stage, a second stage, and a third stage depending on the deterioration level of the display panel DP. From the first stage to the third stage, the stress level of the display panel DP increases and the deterioration area size also increases. The determiner 22 may determine a deterioration stage by comparing the deterioration area size with a reference area size and comparing the stress level with a reference level. A detailed description will be given below with reference to FIGS. 5A and 5B.

The processor 23 may perform compensation processing for changing at least one selected from a spatial resolution and a bit-depth of each of the plurality of areas AR (see FIG. 3) of the display panel DP based on the determined deterioration stage.

In an embodiment, the processor 23 may vary a block size of each of the plurality of blocks BLK (see FIG. 3) in each of the plurality of areas AR to be inversely proportional to the stress level. In such an embodiment, when the stress level of the display panel DP increases, the processor 23 may reduce the block size of each of the blocks BLK of the display panel DP. In such an embodiment, as the deterioration stage proceeds in order of the first stage, the second stage, the third stage, the processor 23 may reduce an average value of block sizes of the blocks BLK of the display panel DP and may increase the spatial resolution.

At a same deterioration stage, the processor 23 may set block sizes between a plurality of adjacent areas, differently from one another. In an embodiment, for example, when stress levels between a plurality of adjacent areas are different from one another, the processor 23 may set a block size of one area having a relatively great (or high) stress level to be smaller than a block size of another area having a relatively small (or low) stress level. In such an embodiment, the processor 23 may set the spatial resolution of one area having a relatively great stress level to be greater than the spatial resolution of another area having a relatively small stress level and may compensate for deterioration of the display panel DP, thereby improving image quality.

In an embodiment, as the deterioration area size and stress level increase in a plurality of areas, the processor 23 may reduce the bit-depth of the display panel DP. In such an embodiment, as the deterioration stage proceeds in order of the first stage, the second stage, or the third stage, the processor 23 may reduce the bit-depth of the display panel DP. As the deterioration area size and the stress level of the display panel DP increase, the processor 23 may decrease an average value of bit-depths of the plurality of areas. As the deterioration stage proceeds in order of the first stage, the second stage, and the third stage, the processor 23 may increase the spatial resolution in each of the plurality of areas while decreasing the bit-depth at the same time.

At a same deterioration stage, the processor 23 may set bit-depths between the plurality of areas differently from one another. In an embodiment, for example, when stress levels between a plurality of areas are different from one another, the processor 23 may set a bit-depth of one area having a relatively great stress level to be greater than a bit-depth of another area having a relatively small stress level.

While lowering the bit-depth at the same time, the processor 23 may increase the spatial resolution by reducing the block size to be proportional to the level of stress accumulated as the deterioration stage proceeds in order of the first stage, the second stage, or the third stage.

Accordingly, while the memory size is maintained, the deterioration compensator 20 may compensate for deterioration of the display panel DP. In such an embodiment, the deterioration compensator 20 may improve image quality by reducing a block size and increasing spatial resolution as the deterioration is severe. At the same time, the deterioration compensator 20 may compensate for deterioration within a limited memory size by simultaneously reducing a bit-depth. In each of the plurality of areas AR of the display panel DP, a bit-depth in an area where the deterioration level is relatively high may be greater than the bit-depth in an area where the deterioration level is relatively low.

The controller 24 may control an operation of and signal transmission between the receiver 21, the determiner 22 and the processor 23.

Figure 5A:
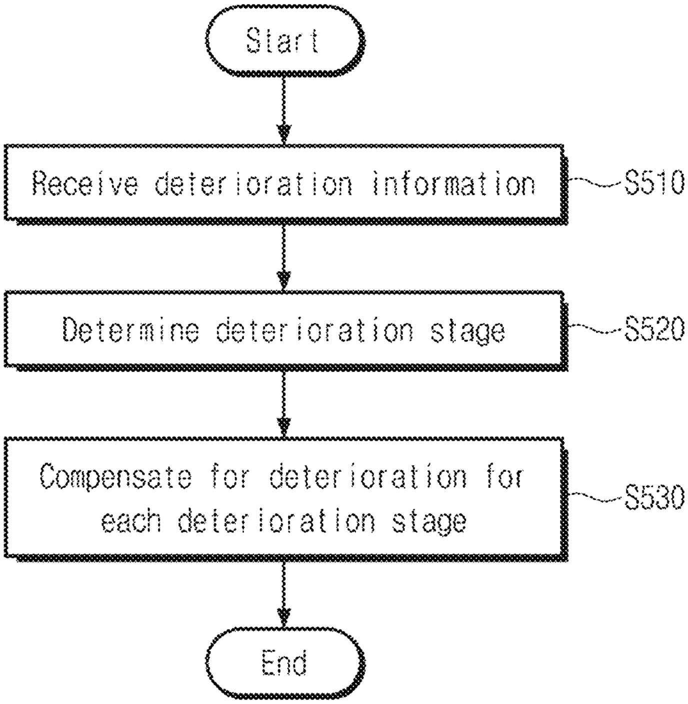
FIGS. 5A and 5B are flowcharts illustrating a deterioration compensating method of a display device, according to an embodiment of the disclosure.
Figure 5B:
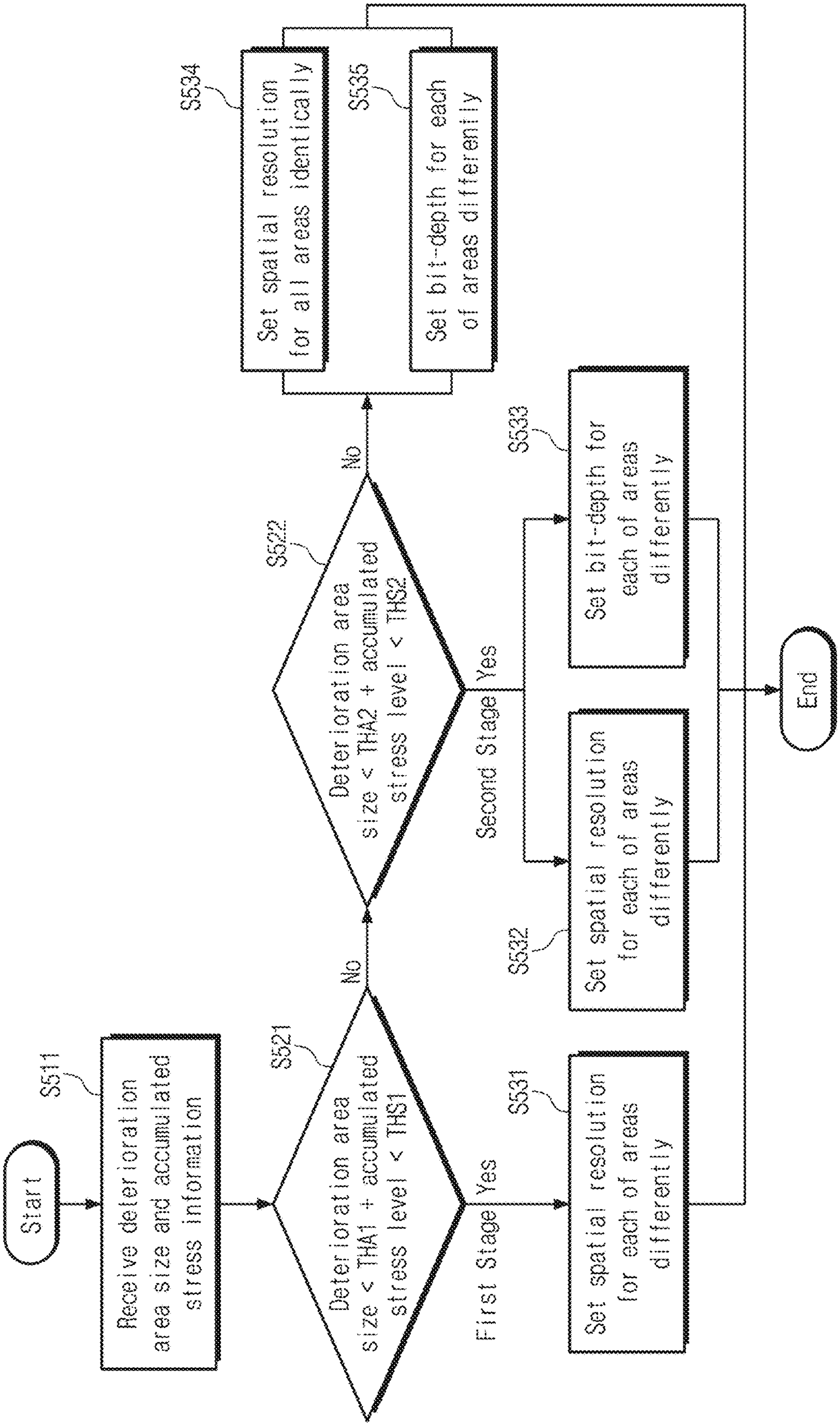

FIGS. 5A and 5B are flowcharts illustrating a deterioration compensating method of a display device, according to an embodiment of the disclosure.

FIG. 5A is a flowchart schematically illustrating a method of compensating for deterioration of a display device. FIG. 5B is a flowchart illustrating a method of compensating for deterioration of a display device according to an embodiment of FIG. 5A. An embodiment of the deterioration compensating method of the display device of FIGS. 5A and 5B will be described with reference to FIGS. 1, 3, and 4.

In an embodiment, as shown in FIG. 5A, the deterioration compensator may receive deterioration information from the memory MM or the stress information generator 10 (S510). Here, the deterioration information may include a deterioration area size and stress information of the display panel DP.

The deterioration compensator 20 may determine a deterioration stage based on the received deterioration information (S520). The deterioration stage may include a first stage, a second stage at which deterioration is severer than deterioration at the first stage, and a third stage at which deterioration is severer than deterioration at the second stage. As the deterioration area size and stress level increase, the deterioration is defined as being severe.

The deterioration compensator 20 may compensate for deterioration of the display panel for each deterioration stage thus determined (S530). In an embodiment, the deterioration compensator 20 may set a spatial resolution and a bit-depth differently for each deterioration stage. In such an embodiment, the deterioration compensator 20 may compensate for deterioration by adjusting the spatial resolution and the bit-depth based on the deterioration level of the display panel DP.

In an embodiment, as shown in FIG. 5B, the receiver 21 may receive the deterioration area size and the stress information (S511).

When the deterioration area size of the display panel DP is smaller than a first reference area size THA1 and the stress level is smaller than a first reference level THS1, the determiner 22 may determine that the deterioration stage is a first stage (S521). The deterioration area size may correspond to an area size occupied by some areas, which have a stress level greater than other areas, from among the plurality of areas AR. Here, the first reference area size THA1 may correspond to 5% to 30% of the total area size of the display panel DP, and the first reference level THS1 may refer to the level of stress that causes deterioration corresponding to the first reference area size THA1.

When the deterioration area size is not smaller than the first reference area size THA1 and is smaller than a second reference area size THA2 and the stress level is not smaller than the first reference level THS1 and is smaller than a second reference level THS2, the determiner 22 may determine that the deterioration stage is a second stage (S521, S522). Here, the second reference area size THA2 is greater than the first reference area size THA1, and the second reference level THS2 is greater than the first reference level THS1. In an embodiment, for example, the second reference area size THA2 may correspond to 60% of the total area size, and the second reference level THS2 may correspond to a level of stress that causes deterioration corresponding to the second reference area size THA2.

When the deterioration area size is not smaller than the second reference area size THA2 and the stress level is not smaller than the second reference level THS2, the determiner 22 may determine that the deterioration stage is a third stage (S522).

At the first stage, the processor 23 may differently set the spatial resolution of each of a plurality of areas (S531). The processor 23 may increase a spatial resolution and may reduce a block size for some areas, each of which have a stress level is greater than areas having different stress levels, from among the plurality of areas AR. At the first stage, the processor 23 may fix the bit-depth of each of a plurality of areas.

At the second stage, the processor 23 may differently set a spatial resolution and a bit-depth of each of a plurality of areas (S532, S533). The processor 23 may increase a spatial resolution (decreasing a block size) for each of some areas, each of which has a stress level is greater than a spatial resolution in each of other areas, from among the plurality of areas AR. At the same time, the processor 23 may reduce the bit-depth of each of the remaining areas other than some areas, each of where has a stress level greater than a stress level of each of other areas, from among the plurality of areas AR. Accordingly, in each of the plurality of areas AR, the bit-depth may also increase when the spatial resolution increases, and the bit-depth may also decrease when the spatial resolution decreases.

At the third stage, the processor 23 may identically set a spatial resolution in each of the plurality of areas AR (S534). At the third stage, the processor 23 may differently set the bit-depth of each of a plurality of areas (S535). In an embodiment, in each of the plurality of areas AR, the processor 23 may fix the spatial resolution to a maximum value and may decrease the bit-depth. The processor 23 may fix the block size of each of the plurality of areas AR to "1×1" and may reduce the bit-depth as a whole. Even in this case, the bit-depth of each of some areas, each of which has a relatively great stress level, from among a plurality of areas may be greater than the bit-depth of each of the remaining areas.

Figure 6A:
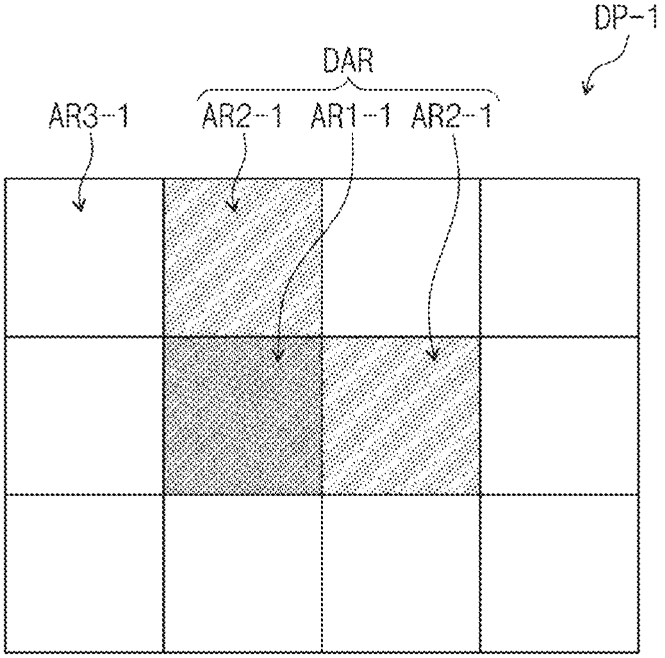
FIGS. 6A to 6C are diagrams illustrating a block size and a bit-depth that are changed at a first stage, according to an embodiment of the disclosure.
Figure 6B:
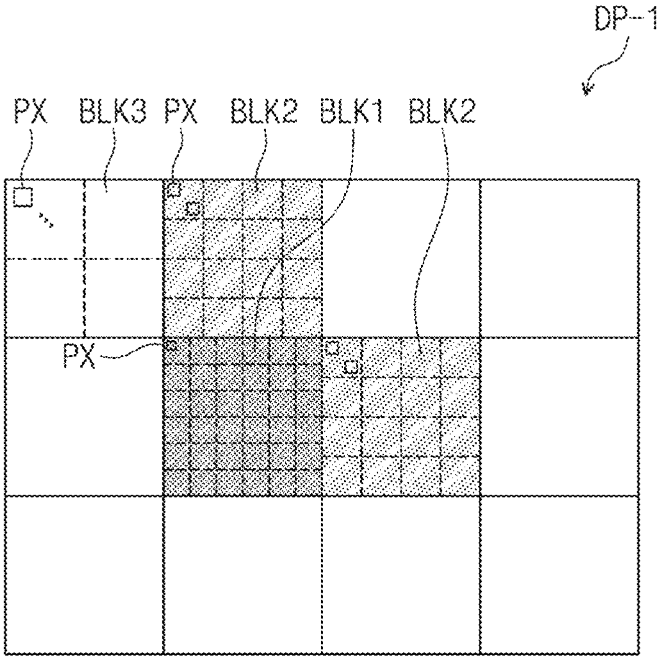
Figure 6C:
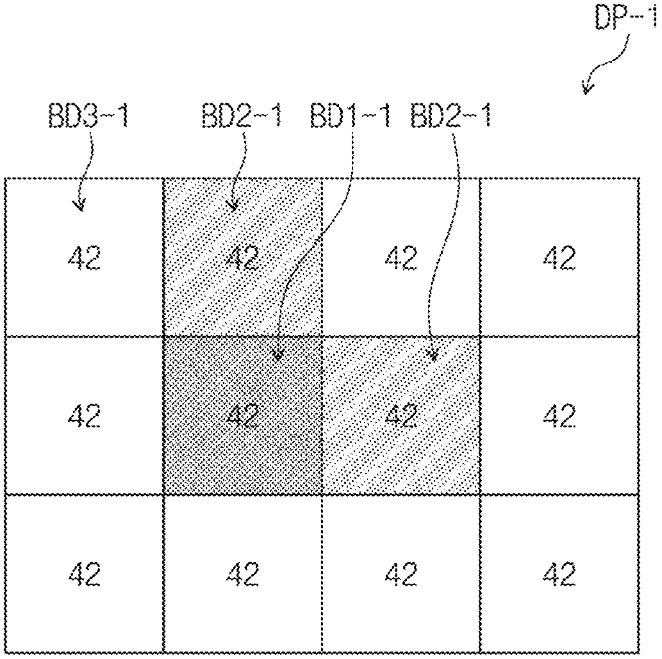

FIGS. 6A to 6C are diagrams illustrating a block size and a bit-depth that are changed at a first stage, according to an embodiment of the disclosure. FIG. 6A shows a stress level of each of a plurality of areas, FIG. 6B shows a block size of each of the plurality of areas, and FIG. 6C shows a bit-depth of each of the plurality of areas.

FIGS. 6A to 6C show an embodiment where the first reference area size THA1 (see FIG. 5B) operating as a reference at a deterioration stage is set to 30% of the total area size, and the second reference area size THA2 (see FIG. 5B) is set to 60% of the total area size.

Referring to FIGS. 6A to 6C, a display panel DP-1 at a first stage may include a first area AR1-1, a second area AR2-1, and a third area AR3-1. The first area AR1-1 and the second area AR2-1 may correspond to a deterioration area DAR. The size of an area occupied by the deterioration area DAR may correspond to a deterioration area size. In FIG. 6A, the deterioration area size may correspond to 25% of the total area size. In an embodiment, a stress level in the first area AR1-1 may be greater than a stress level in the second area AR2-1.

In FIG. 6B, a first block size BLK1 of the first area AR1-1 is smaller than a second block size BLK2 of the second area AR2-1. Accordingly, the spatial resolution of the first area AR1-1 is greater than the spatial resolution of the second area AR2-1. A third block size BLK3 of the third area AR3-1 is greater than the first block size BLK1 or the second block size BLK2. In an embodiment, for example, the first block size BLK1 may correspond to a size including one pixel PX, the second block size BLK2 may correspond to a size including two pixels PX, and the third block size BLK3 may correspond to a size including three pixels PX or more. In such an embodiment, the block size of each of the plurality of areas may be changed based on the stress level of each of the plurality of areas.

In FIG. 6C, the bit-depth in each of a plurality of areas at the first stage may be fixed to 42 bits. In such an embodiment, a first bit-depth BD1-1 of the first area AR1-1, a second bit-depth BD2-1 of the second area AR2-1, and a third bit-depth BD3-1 of the third area AR3-1 may be the same as one another.

Figure 7A:
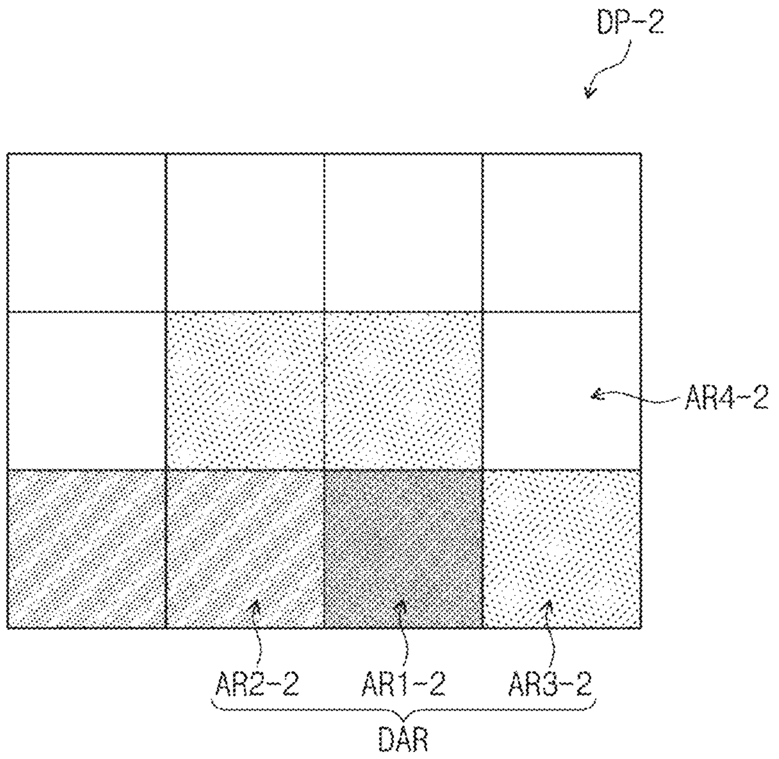
FIGS. 7A to 7C are diagrams illustrating a block size and a bit-depth that are changed at a second stage, according to an embodiment of the disclosure.
Figure 7B:
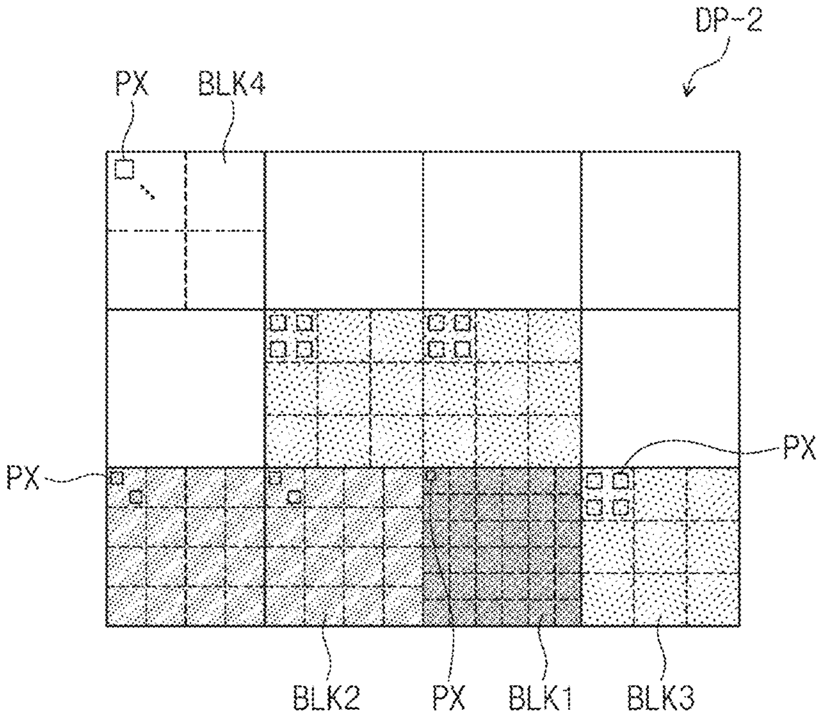
Figure 7C:
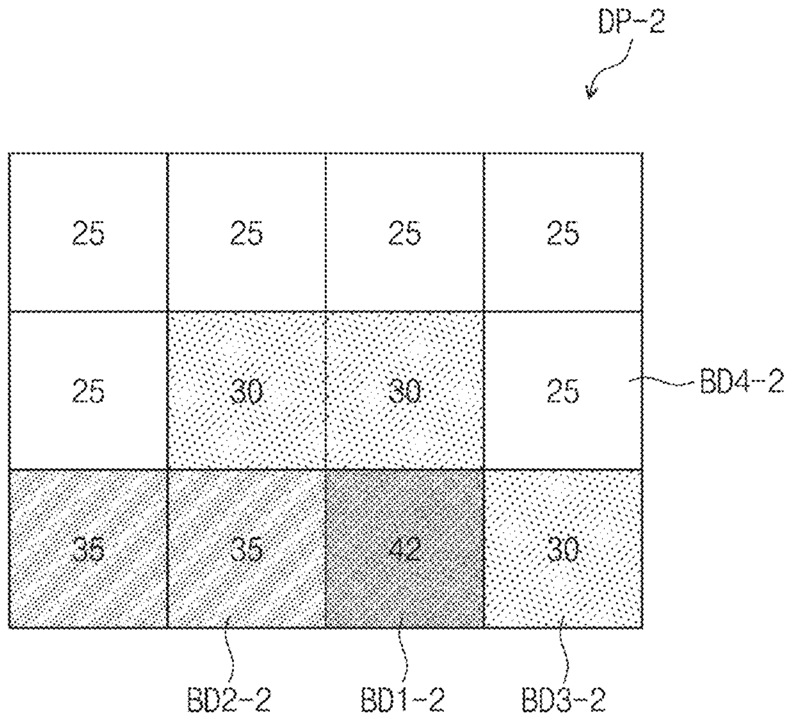

FIGS. 7A to 7C are diagrams illustrating a block size and a bit-depth that are changed at a second stage, according to an embodiment of the disclosure.

Referring to FIGS. 7A to 7C, a display panel DP-2 at the second stage may include a first area AR1-2, a second area AR2-2, a third area AR3-2, and a fourth area AR4-2. The first area AR1-2, the second area AR2-2, and the third area AR3-2 may correspond to the deterioration area DAR. The size of an area occupied by the deterioration area DAR may correspond to a deterioration area size. In FIG. 7A, the deterioration area size may correspond to 50% of the total area size. In an embodiment, a stress level in the first area AR1-2 may be greater than a stress level in the second area AR2-2. A stress level of the second area AR2-2 may be greater than a stress level of the third area AR3-2. The stress level of the third area AR3-2 may be greater than a stress level of the fourth area AR4-2.

In FIG. 7B, the first block size BLK1 of the first area AR1-2 is smaller than the second block size BLK2 of the second area AR2-2. Accordingly, the spatial resolution of the first area AR1-2 is greater than the spatial resolution of the second area AR2-2. The second block size BLK2 of the second area AR2-2 is smaller than the third block size BLK3 of the third area AR3-2. Accordingly, the spatial resolution of the second area AR2-2 is greater than the spatial resolution of the third area AR3-2. A fourth block size BLK4 of the fourth area AR4-2 is greater than the first block size BLK1, the second block size BLK2, or the third block size BLK3. Accordingly, each of the spatial resolutions of the first to third areas AR1-2, AR2-2, and AR3-2 may be greater than the spatial resolution of the fourth area AR4-2.

In an embodiment, for example, as shown in FIG. 7B, the first block size BLK1 may correspond to a size including one pixel PX, the second block size BLK2 may correspond to a size including two pixels PX, the third block size BLK3 may correspond to a size including four pixels PX, and the fourth block size BLK4 may correspond to a size including five pixels PX or more. The block size of each of the plurality of areas may be changed based on the stress level of each of the plurality of areas.

In an embodiment, as shown in FIG. 7C, the bit-depth in each of a plurality of areas of the display panel DP-2 at the second stage may be changed to 42 bits, 35 bits, 30 bits, or 25 bits. In such an embodiment, a first bit-depth BD1-2 in the first area AR1-2 may be 42 bits and may have the greatest number of bits, a second bit-depth BD2-2 of the second area AR2-2 may be 35 bits and may be smaller than the first bit-depth BD1-2, and a third bit-depth BD3-2 of the third area AR3-2 may be 30 bits and may be smaller than the second bit-depth BD2-2. The fourth bit-depth BD4-2 of the fourth area AR4-2 may be 25 bits and may have the smallest number of bits. In such an embodiment, the bit-depth in each of the plurality of areas may be changed depending on the stress level in each of the plurality of areas. The stress level may be proportional to the bit-depth.

Figure 8A:
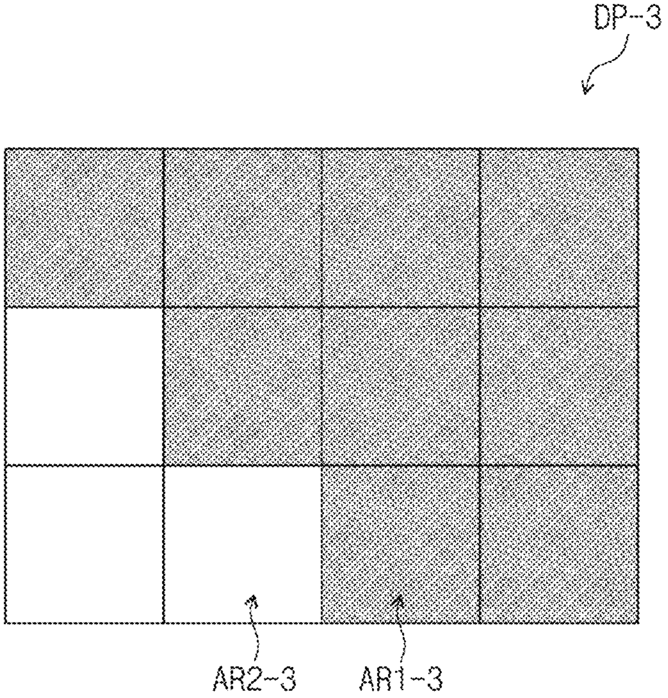
FIGS. 8A to 8C are diagrams illustrating a block size and a bit-depth that are changed at a third stage, according to an embodiment of the disclosure.
Figure 8B:
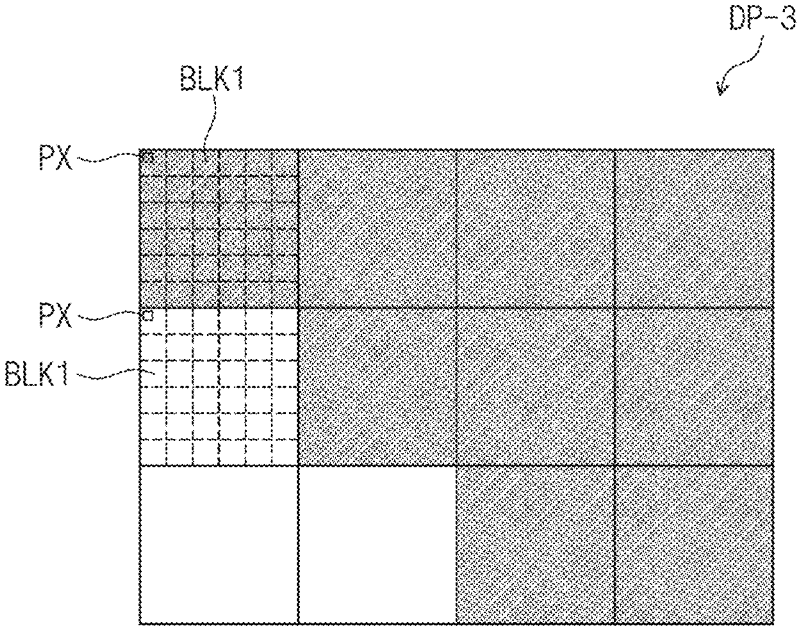
Figure 8C:
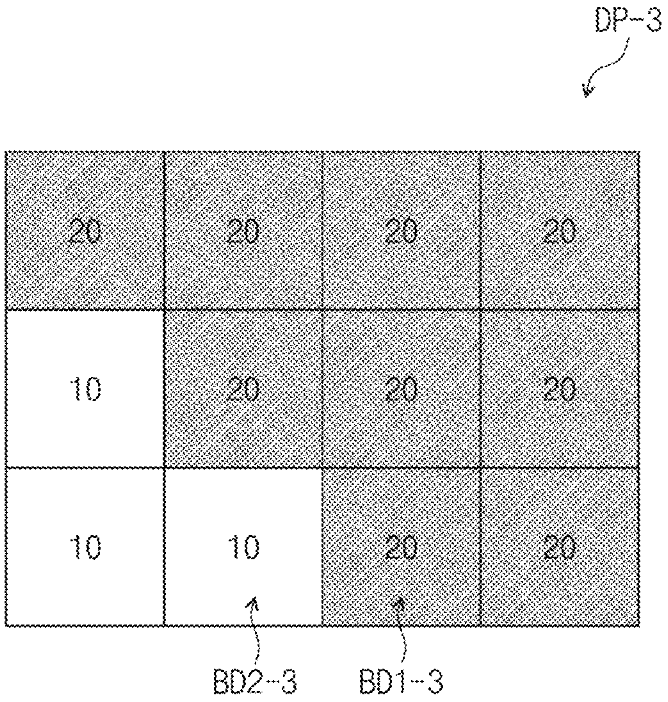

FIGS. 8A to 8C are diagrams illustrating a block size and a bit-depth that are changed at a third stage, according to an embodiment of the disclosure.

Referring to FIGS. 8A to 8C, a display panel DP-3 of the third stage may include a first area AR1-3 and a second area AR2-3. The first area AR1-3 may correspond to a deterioration area. In FIG. 8A, the deterioration area size may correspond to 75% of the total area size. In an embodiment, a stress level in the first area AR1-3 may be greater than a stress level in the second area AR2-3.

In an embodiment, as shown in FIG. 8B, the block size BLK1 of the first area AR1-3 may be the same as the block size BLK1 of the second area AR2-3. Accordingly, the spatial resolution of the first area AR1-3 may be the same as the spatial resolution of the second area AR2-3. That is, the block size BLK1 of each of a plurality of areas in the display panel DP-3 at the third stage may be set identically. In an embodiment, for example, the block size BLK1 may have a maximum size of 1×1 in which one pixel PX is positioned per block. That is, all the block sizes of the plurality of areas may be identically fixed regardless of the stress level of each of the plurality of areas.

In an embodiment, as shown in FIG. 8C, the bit-depth in each of a plurality of areas of the display panel DP-3 at the third stage may be changed to 20 bits or 10 bits. The first bit-depth BD1-3 in the first area AR1-3 may be 20 bits, and the second bit-depth BD2-3 of the second area AR2-3 may be 10 bits. That is, the first bit-depth BD1-3 of the first area AR1-3 having a relatively great stress level may be greater than the second bit-depth BD2-3 of the second area AR2-3.

In an embodiment, an average value of bit-depths of a plurality of areas in the display panel DP-3 at the third stage may be less than an average value of bit-depths of a plurality of areas of the display panel DP-2 at the second stage, and an average value of bit-depths in a plurality of areas of the display panel DP-2 at the second stage may be less than an average value of bit-depths of a plurality of areas of the display panel DP-1 at the first stage.

In such an embodiment, an average value of spatial resolutions of a plurality of areas of the display panel DP-3 at the third stage may be greater than an average value of spatial resolutions of a plurality of areas of the display panel DP-2 at the second stage, and an average value of spatial resolutions of a plurality of areas of the display panel DP-2 at the second stage may be greater than an average value of spatial resolutions of a plurality of areas of the display panel DP-1 at the first stage.

A deterioration area size is greatest in the display panel DP-3 at the third stage. Accordingly, in an embodiment of the disclosure, deterioration of a display panel may be effectively prevented within a memory size identically set at the first stage, the second stage, and the third stage by reducing the overall size of bit-depth as much as compensation while the spatial resolution of each of a plurality of areas is fixed to a maximum value.

According to embodiments of the disclosure, a display device and a method of compensating for deterioration of the display device may compensate for deterioration of a display panel and may reduce a memory size used for the compensation by receiving stress information according to a deterioration level of the display panel and changing at least one selected from a spatial resolution and a bit-depth in each of a plurality of areas of the display panel based on the stress information.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel which displays an image, wherein a plurality of areas, in each of which a plurality of pixels is positioned, is defined in the display panel; and a controller which generates image data based on an image signal and compensates for deterioration of the display panel, wherein the controller includes:

a stress information generator which generates stress information including a stress level and a deterioration area size of the display panel corresponding to the deterioration; and a deterioration compensator which determines a deterioration stage based on the stress information of each of the plurality of areas and selectively changes at least one selected from a spatial resolution and a bit-depth of each of the plurality of areas depending on the deterioration stage determined based on the stress information of each of the plurality of areas, wherein the deterioration compensator determines the deterioration stage by comparing the deterioration area size with a reference area size and comparing the stress level with a reference level, wherein deterioration compensator determines the deterioration stage as a first stage when the deterioration area size is smaller than a first reference area size and the stress level is smaller than a first reference level, wherein deterioration compensator determines the deterioration stage as a second stage when the deterioration area size is not smaller than the first reference area size and is smaller than a second reference area size and the stress level is not smaller than the first reference level and is smaller than a second reference level, wherein deterioration compensator determines the deterioration stage as a third stage when the deterioration area size is not smaller than the second reference area size and the stress level is not smaller than the second reference level, and wherein the deterioration compensator selectively changes the at least one selected from the spatial resolution and the bit-depth depending on the deterioration stage.

2. The display device of claim 1, further comprising:

a memory connected to the controller, wherein the memory stores the stress information, wherein a plurality of blocks, each of which includes the plurality of pixels, is defined in each of the plurality of areas, and wherein the stress information is stored in units of blocks.

3. The display device of claim 1, wherein the spatial resolution is determined based on a number of the plurality of pixels included in each of a plurality of blocks included in each of the plurality of areas, wherein the number of the plurality of pixels included in each of the plurality of blocks is proportional to a block size of each of the plurality of blocks, and wherein the deterioration compensator changes the block size in each of the plurality of areas to be inversely proportional to the stress level of each of the plurality of areas.

4. The display device of claim 1, wherein the deterioration compensator changes the bit-depth of each of the plurality of areas to be proportional to the stress level of the display panel in each of the plurality of areas.

5. The display device of claim 1, wherein the deterioration compensator includes:

a receiver which receives the stress information including information about the stress level and the deterioration area size of the display panel from the stress information generator;

a determiner which determines the stress level and the deterioration area size; and a processor which changes the at least one selected from the spatial resolution and the bit-depth based on the stress level and the deterioration area size.

6. The display device of claim 5, wherein the second reference area size is greater than the first reference area size and the second reference level is greater than the first reference level.

7. The display device of claim 6, wherein the processor changes the spatial resolution of each of the plurality of areas and fixes the bit-depth when the deterioration stage is the first stage.

8. The display device of claim 6, wherein the processor changes the spatial resolution and the bit-depth of each of the plurality of areas when the deterioration stage is the second stage.

9. The display device of claim 8, wherein the changed spatial resolution and the changed bit-depth of each of the plurality of areas are proportional to each other when the deterioration stage is the second stage.

10. The display device of claim 6, wherein the processor fixes the spatial resolution of each of the plurality of areas and changes the bit-depth when the deterioration stage is the third stage.

11. The display device of claim 10, wherein the processor fixes the spatial resolution of each of the plurality of areas to a maximum value and reduces the bit-depth when the deterioration stage is the third stage.

12. The display device of claim 6, further comprising:

a memory connected to the controller, wherein the memory stores the stress information, wherein a size of the memory is constant regardless of the deterioration area size and the stress level.

13. The display device of claim 6, wherein an average value of the spatial resolution of each of the plurality of areas when the deterioration stage is the first stage is smaller than an average value of the spatial resolution of each of the plurality of areas when the deterioration stage is the second stage, and wherein the average value of the spatial resolution of each of the plurality of areas when the deterioration stage is the second stage is smaller than an average value of the spatial resolution of each of the plurality of areas when the deterioration stage is the third stage.

14. The display device of claim 6, wherein an average value of the bit-depth of each of the plurality of areas when the deterioration stage is the first stage is greater than an average value of the bit-depth of each of the plurality of areas when the deterioration stage is the second, and wherein the average value of the bit-depth of each of the plurality of areas when the deterioration stage is the second stage is greater than an average value of the bit-depth of each of the plurality of areas when the deterioration stage is the third stage.

15. The display device of claim 6, wherein, when the deterioration stage is changed from the first stage to the second stage, an average value of the spatial resolution of each of the plurality of areas increases and an average value of the bit-depth of each of the plurality of areas decreases.

16. A method of compensating for deterioration of a display device, the method comprising:

generating, by a stress information generator, stress information corresponding to the deterioration of a display panel; and determining, by a deterioration compensator, a stage of the deterioration based on the stress information of each of a plurality of areas defined in the display panel, and selectively changing, by the deterioration compensator, at least one selected from a spatial resolution and a bit-depth of each of the plurality of areas depending on the stage of the deterioration determined based on the stress information of each of the plurality of areas, wherein the stress information includes information about a deterioration area size and a stress level, wherein the stage of the deterioration is determined by comparing the deterioration area size with a reference area size and comparing the stress level with a reference level, wherein deterioration compensator determines the deterioration stage as a first stage when the deterioration area size is smaller than a first reference area size and the stress level is smaller than a first reference level, wherein deterioration compensator determines the deterioration stage as a second stage when the deterioration area size is not smaller than the first reference area size and is smaller than a second reference area size and the stress level is not smaller than the first reference level and is smaller than a second reference level, wherein deterioration compensator determines the deterioration stage as a third stage when the deterioration area size is not smaller than the second reference area size and the stress level is not smaller than the second reference level, and wherein the deterioration compensator selectively changes the at least one selected from the spatial resolution and the bit-depth depending on the deterioration stage.

17. The method of claim 16, wherein the second reference area size is greater than the first reference area size, and the second reference level is greater than the first reference level.

18. The method of claim 17, wherein the changing the at least one selected from the spatial resolution and the bit-depth depending on the stage of the deterioration includes:

changing the spatial resolution of each of the plurality of areas and fixing the bit-depth when the stage of the deterioration is the first stage;

changing the spatial resolution and the bit-depth of each of the plurality of areas when the stage of the deterioration is the second stage; and fixing the spatial resolution of each of the plurality of areas and changing the bit-depth when the stage of the deterioration is the third stage.

19. The method of claim 16, wherein the spatial resolution is determined based on a number of a plurality of pixels included in each of a plurality of blocks included in each of the plurality of areas, and wherein the number of the plurality of pixels is proportional to a block size of each of the plurality of blocks, wherein the changing, by a deterioration compensator, the at least one selected from the spatial resolution and the bit-depth includes:

changing the block size to be inversely proportional to a stress level of the display panel in each of the plurality of areas; and changing the bit-depth to be proportional to the stress level of the display panel in each of the plurality of areas.

* * * * *